United States Patent
Gallick

(10) Patent No.: US 7,907,702 B2
(45) Date of Patent: Mar. 15, 2011

(54) COMMUNICATION DEVICE FOR VISUALLY IMPAIRED PERSONS

(75) Inventor: Robert Lawrence Gallick, Phoenix, AZ (US)

(73) Assignee: Inter-Tel (Delaware), Inc, Tempe, AZ (US)

( * ) Notice: Subject to any disclaimer, the term of this patent is extended or adjusted under 35 U.S.C. 154(b) by 1227 days.

(21) Appl. No.: 11/499,444

(22) Filed: Aug. 4, 2006

(65) Prior Publication Data

US 2008/0043934 A1    Feb. 21, 2008

(51) Int. Cl.
*H04M 11/00*     (2006.01)

(52) U.S. Cl. ............... 379/52; 379/67.1; 379/90.01

(58) Field of Classification Search ............ 379/52, 379/67.1, 68, 88.14, 88.15, 88.22, 88.24, 379/90.01, 93.05, 93.06, 361, 359, 355, 368, 379/356; 455/550, 464, 422
See application file for complete search history.

(56) References Cited

U.S. PATENT DOCUMENTS

| | | | |
|---|---|---|---|
| 6,115,482 A | 9/2000 | Sears et al. | |
| 6,477,390 B1 * | 11/2002 | Gum et al. | 455/550.1 |
| 6,728,754 B1 * | 4/2004 | Lipton | 709/203 |
| 7,499,532 B2 * | 3/2009 | Pearson et al. | 379/90.01 |
| 2003/0022701 A1 * | 1/2003 | Gupta | 455/566 |
| 2003/0097262 A1 * | 5/2003 | Nelson | 704/235 |
| 2005/0268111 A1 * | 12/2005 | Markham | 713/186 |
| 2006/0022959 A1 * | 2/2006 | Geaghan | 345/173 |
| 2007/0238074 A1 * | 10/2007 | Espenlaub et al. | 434/112 |

FOREIGN PATENT DOCUMENTS

JP      2004254198 A * 9/2004

* cited by examiner

*Primary Examiner* — Melur Ramakrishnaiah
(74) *Attorney, Agent, or Firm* — Michelle Whittington, Esq

(57) ABSTRACT

A communication device for visually impaired persons assists the user to determine the function of each key and input on the modern-day device. The communication device includes a plurality of surface sensors that when activated, guide the user in call placement, routing, control options and general communications. The device may include a vibration feature that causes an area on the device to vibrate. A whisper audio feature may audibly coach the user when sensed areas are touched. Additionally, a networked device may provide third party assistance to the user. The techniques of the various embodiments provide effective guidance without disrupting the user, the called party or others in proximity to the user, such as in an office-type environment.

12 Claims, 5 Drawing Sheets

COMMUNICATION DEVICE FOR VISUALLY IMPAIRED PERSONS

FIELD OF INVENTION

The present invention relates generally to a communication device for visually impaired persons.

BACKGROUND OF THE INVENTION

Blind and partially sighted people have the same communication and information needs as everyone else. But many visually impaired people are not able to communicate effectively or understand the information because modern-day communication devices are not tailored for them.

A visually impaired person's ability to use modern complex communication devices is extremely limited. Even if the user is trained to use the device and is able to memorize the location and function of the numerous buttons, they remain unable to navigate graphically menu driven devices. In addition to graphical menus, communication devices have several identically shaped input jacks for peripheral devices such as headphones, microphones, cameras, and keyboards. For the visually handicapped user, finding the matching input receptacle for a peripheral device is a challenge of trial and error.

Braille is a system of raised dots which people can read with their fingers. Many blind and partially sighted people are able to understand particular types of information in Braille, such as information to be used in meetings or to be read silently. Braille can be used on communication devices by raising the telephone keys and adding the Braille characters. Braille telephones typically have large oversized keys to make "reading" the keys easier. However, it is physically impractical for every key and function button on a modern-day device to include Braille dots on each key or adjacent to each key. As a result, the blind user sacrifices many of the innovative telephone features available in exchange for use of the space-taking Braille key pads.

Moon is another system of reading by hand in which tactile symbols based on lines and curves are used to represent letters, numbers and punctuation marks. The advantages of Moon over Braille are that the system is easier to learn, the letters are easier to distinguish by touch, and it is easier for sighted people to understand. The main drawback of Moon is that it is bulkier than Braille and even more impractical for use on communication devices.

Audio announce features are yet another option for visually impaired persons using communication devices. An electronic voice calls out each number when dialing as well as the name and number of a called party when a recognized programmable key is depressed. Audio announcing provides the visually impaired person with assurance that the correct number was depressed but does very little to assist in the navigation of the device itself. Additionally, loud audio announce features can be distracting if the user is talking on the telephone and is not conducive to an office-type environment. Other audio techniques, such as automatic speech recognition, may be available to assist the blind user in navigating around a complex keyset. Again, these types of audio features may be annoying while the user is on a call or distracting to others who are in close proximity to the communication device. Additionally, it is difficult to have an effective speech recognition engine for every key and input on the telephone.

Accordingly, it is desirable to have a communication device that assists the visually impaired user to determine the function of each key and input on the modern-day communication device. Furthermore, such assisting techniques should not rely on space-taking prior art techniques, such as Braille, but rather be integrated in the device so the blind user can benefit from even the most innovative communication features. It is also desirable to assist the visually impaired user with call placement, routing, and control options in such a manner that is not disruptive to the user, the called party or an office-type environment.

BRIEF DESCRIPTION OF THE DRAWINGS

Features, aspects, and advantages of the present invention may be best understood by reference to the following description taken in conjunction with the accompanying drawings, wherein like reference numerals indicate similar elements.

DETAILED DESCRIPTION

A communication device for visually impaired persons in accordance with the various embodiments of the invention assists the user to determine the function of each key and input on the modern-day device. The communication device includes a plurality of surface sensors that when activated, guide the user in call placement, routing, control options and general communications. Additionally, the techniques employed by a communication device of the various embodiments provides effective guidance without disrupting the user, the called party or others, such as in an office-type environment.

Figure 1:
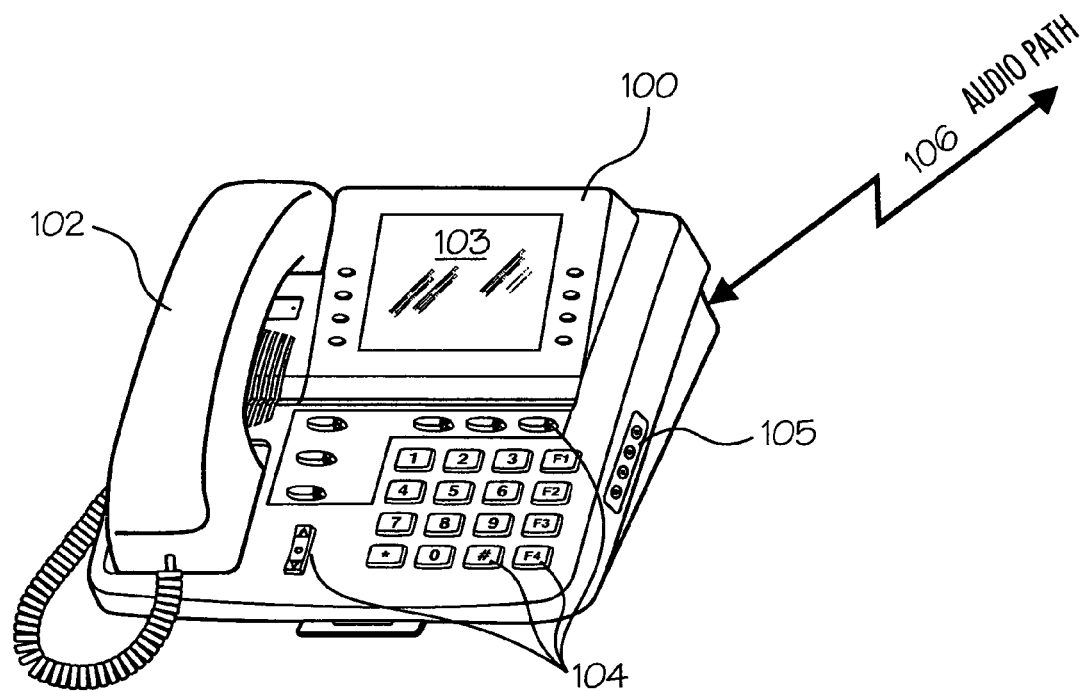
FIG. 1 illustrates a communication device for visually impaired persons in accordance with an exemplary embodiment.

FIG. 1 illustrates a communication device 100 for visually impaired persons in accordance with an exemplary embodiment of the invention. It should be appreciated that the illustrative figure, as well as the accompanying text and this disclosure, may conveniently describe the invention as a desktop telephonic device, however, the disclosure is not so limiting. Rather, the inventive concepts as disclosed herein may be useful in a variety of communication devices including, but not limited to, telephones (stationary and portable; digital and analog), keysets, personal digital assistants, pagers, wireless remote clients, and messaging devices. It should also be realized that, although not pictured, a communication device in accordance with the disclosure may include additional software components, networked devices, routing and switching elements, coupled computing devices, and various other hardware and/or software used in a modern-day telecommunications setting. In nearly all aspects, communication device 100 has a similar physical appearance as most other comparable communication device. Thus, communication device 100 is equally operable by blind, partially blind and sighted users.

In general, communication device 100 includes a plurality of surface sensors and is coupled to a communication channel 106. The surface sensors represent trigger areas on communication device 100 that when activated, guide the user in communication. For example, the surface sensors may include a handset 102, a display 103, a plurality of keys 104, and one or more input jacks 105. In one embodiment, surface sensors include areas on communication device 100 that are coupled to surface touch sensors. In this manner, a visually impaired person is guided by the reaction to touching the trigger areas on communication device 100. Additional details regarding the surface sensors are discussed in the following figures and accompanying texts.

Handset 102 need not be a traditional corded handset (as depicted), but can be any suitable ear and/or mouth piece unit or mechanism used for capturing and transmitting voice signals to and from the user. Keys 104 may include traditional alpha numeric indicators as well as programmable function soft keys both of which are commonly found on modern-day communication devices. In accordance with the various embodiments of the communication device, the "keys" may be raised or flush depressible elements or may be non-depressible and activated simply by touch. Additional features of the keys will be discussed in more detail below.

Inputs 105 include any suitable input/output jack or plug commonly found on communication devices. These plugs are typically used to connect peripheral devices including, but not limited to, headphones, microphones, cameras, and keyboards. The plugs may also be used to connect power chargers, cables, wires, other routing equipment, and other communication or computing devices.

Communication channel 106 may include any external data interface suitable for coupling communication device 100 to a communication network. Channel 106 may include, but not limited to, LAN, Ethernet, wired and wireless solutions, or any other communication medium suitable for routing data, information, video and/or voice.

Figure 2:
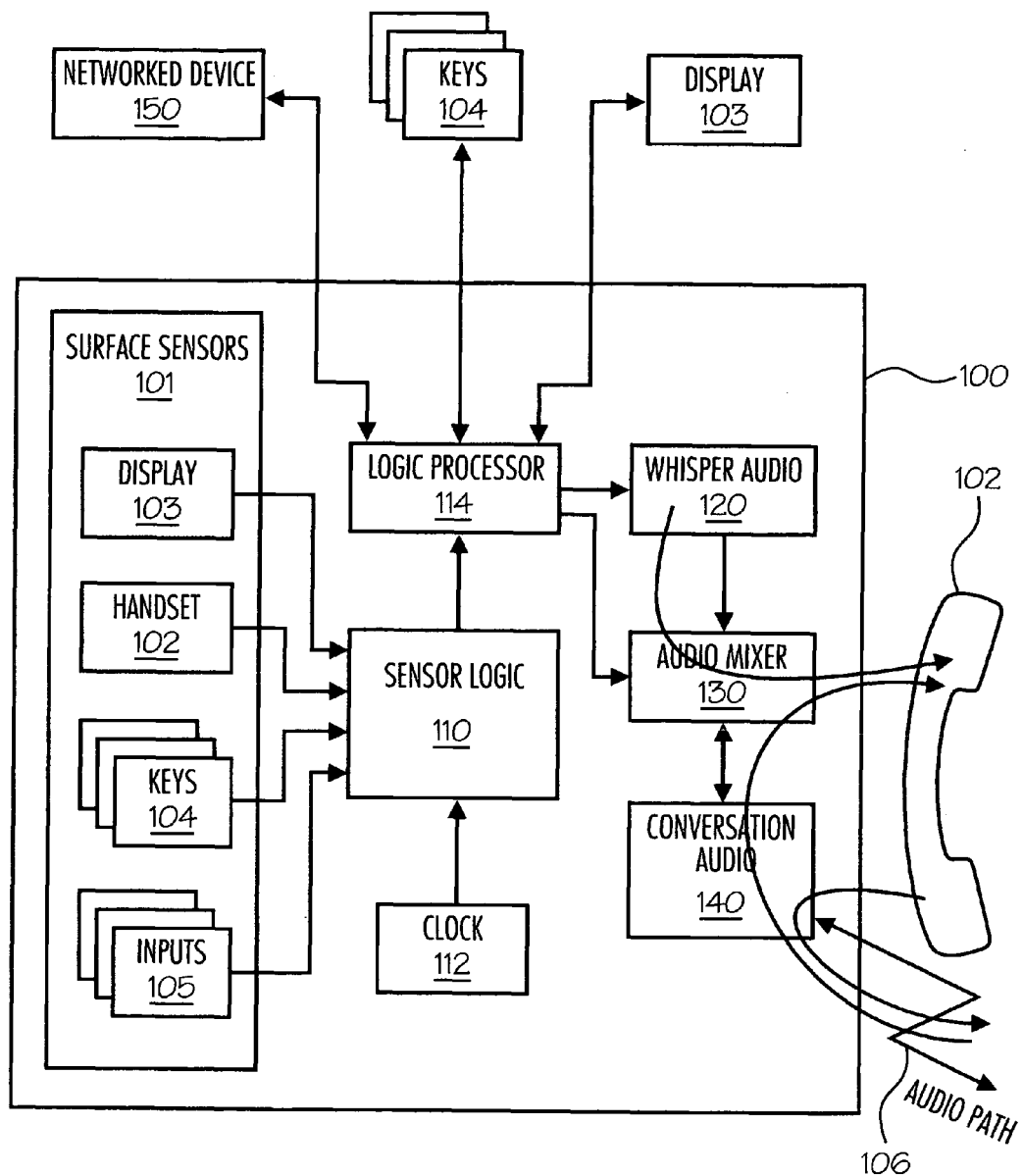
FIG. 2 illustrates a block diagram of a communication device in accordance with the various embodiments.

FIG. 2 illustrates a block diagram of communication device 100 in accordance with the various embodiments. Communication device 100 includes a plurality of surface sensors 101 used for assisting the visually impaired user in determining the function of each key and input, and also guiding the user in general communications. For example, surface sensors 101 may be on the display 103 of communication device 100, the handset 102, the keys 104, and the input or output connectors 105. In one embodiment, surface sensors 101 are capacitive sensors and well-established techniques for providing capacitive surfaces for capacitive switch input may be used.

The user touches surface sensors 101 to trigger one or more guidance features. By "user touch" it is meant by the user's actual hand or in the case of the inputs, the touch may be the user holding a plug and it is the plug that is actually touching the input.

In one particular embodiment, activation of surface sensors 101 causes one or more parts of communication device 100 to briefly vibrate. This may be especially helpful to locate a "home key" or answer key, such as when the user is wearing a headset. The vibration may further guide the user in determining a particular input jack. A Piezo Electric actuator may be used to create the vibration, although it should be appreciated that various other hardware/software vibration techniques are available.

In another embodiment, activation of surface sensors 101 causes an audio attribute that the user can hear. In one particular embodiment, the audio is a "whisper message" such that only the user can hear the audio and not the called party or others in proximity to the user. A "whisper message" or "whisper audio" may include audible tones or speech. For example, if the user touches the volume up key during a conversation, surface sensor 101 coupled to the key triggers an audio response and the user will hear a soft "up" message in the ear piece. Communication device 100 coaches the user in a convenient, non-disruptive manner using audio whispers that only the user can hear. Additional features of the audio attributes will be discussed below.

In yet another embodiment, activation of surface sensors 101 causes operation of a third party interface. In one particular embodiment, a third party user is able to view a replication of communication device 100 on, for example, a remote display. The third party user can see the key touches and key depressions that are made on communication device 100 by the user. In one embodiment, the data may be formatted as XML data and presented to any external system. This data may conveniently reside on HTTP or any other protocol. The third party user assisting the visually impaired user could know, for example, when handset 102 was off hook or when the user was touching the "5" key, or even when the user was attempting to couple a headset to one of the inputs of communication device 100. Additionally, the third party user may have a connected audio path from the coach to the user to enable remote whisper coaching to the user. The third party user may also have the ability to remotely toggle keys for the assisted user, such as in paired-phone architecture. It should be appreciated that such a remote interface may conveniently include a soft phone and the keys and keystrokes of the assisted user may be displayed on a graphical user interface.

With continued reference to FIG. 2, surface sensors 101 are coupled to a sensor logic 110. A clock input 112 may be used to snap-shot the surfaces at selected intervals for determination of an activated sensor. This provides an input pattern that is not randomly changing. It also allows for easier parsing of the user's activities and a more elegant response to the user. A logic processor 114 receives signals from sensor logic 110 as well as signals from keys 104 and display 103. Likewise, logic processor 114 can send signals to the keys, inputs, handset, and display of communication device 100. Logic processor 114 includes programming instructions for the various guidance features of communication device 100. For example, logic processor 114 may send a command to key 104 that causes the key to slightly vibrate. Logic processor 114 may also send a command to a networked device 150 to initiate a third party interface. Commands from logic processor 114 to display 103 may be in extra large print for the visually impaired or in another format, such as Braille. In addition, logic processor 114 may cause an LED in or adjacent to a key to light in a steady or flashing state to communicate with normal visioned persons or partially visually impaired persons.

Communication channel or audio path 106 represents the communications between communication device 100 and another device. For convenience, audio path 106 is described as audio signals; however, it should be appreciated that other media formats may be present on the path, such as instant text messaging. The audio from the caller terminates at conversation audio 140 which represents the appropriate audio interface devices and software, e.g., an audio codec.

An audio mixer 130 receives the formatted conversation audio from 140 and also receives any audio commands from logic processor 114 or whisper audio 120. Whisper audio 120 includes a storage of pre-recorded audio messages or has the ability to generate text-to-speech messages, as well as process any audio signals received from a third party providing audio assistance, e.g., via networked device 150, that will be audible only to the user. For example, during a conversation, audio from the called party may be mixed with a whisper audio message so that only the user will hear the whisper audio in the ear piece, e.g., handset 102. Likewise, audio spoken by the user is received at conversation audio 140 and sent to the caller via audio path 106, but will not be mixed with any whisper audio messages.

Additional details regarding the various elements and operation of the communication device 100 will be described in the following flowcharts and accompanying text. The flowcharts are provided to better understand the various steps of operation in assisting the visually impaired user to determine the function of each key and input as well as guiding the user in call placement, routing, control options and general communications. It should be realized that the following description is not intended to be limiting but rather to provide a description of various embodiments and a best mode of operation. It should be appreciated that additional steps may occur that are not represented on the flowcharts but are discussed in the conjoining text or elsewhere herein. Moreover, there may be operations, functions, routines, and the like that are not depicted on the flowcharts or elsewhere but are well understood in the industry as common actions for a communications device and/or system. Unless specifically stated, the order of the depicted and described operations are not limited to the conjoining description.

Figure 3:
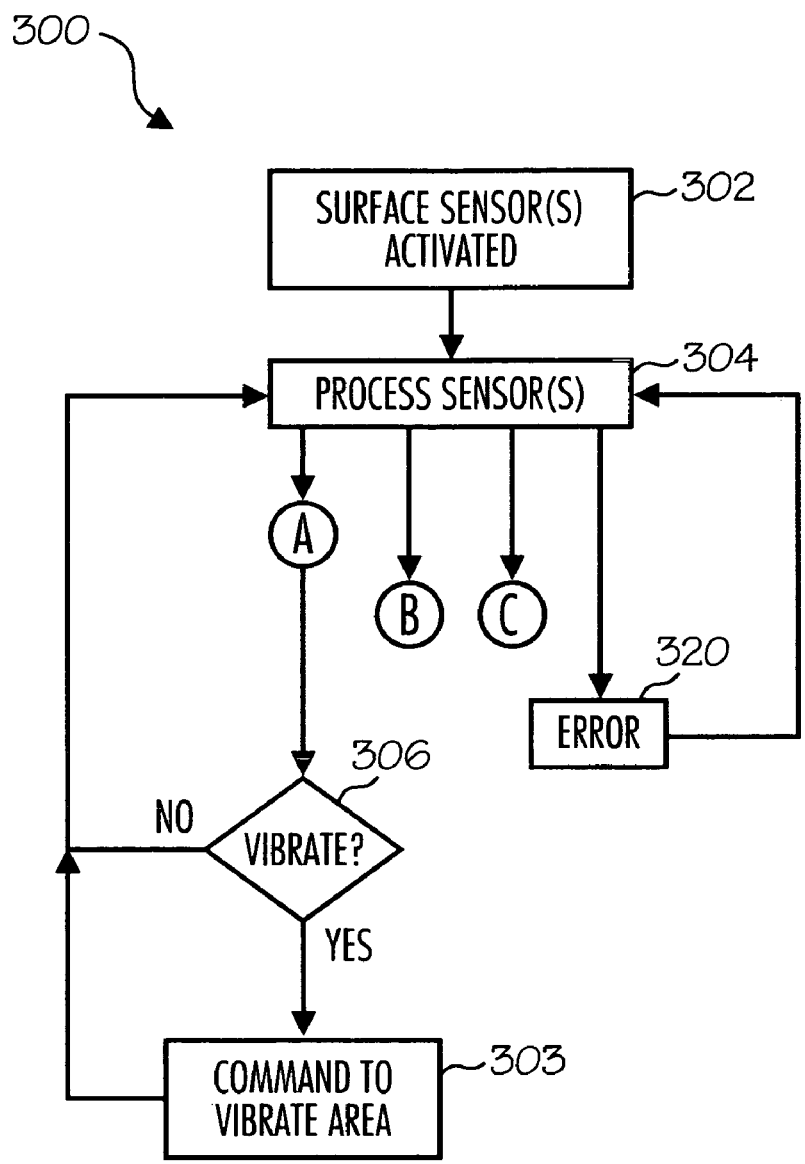
FIGS. 3-5 are flowcharts of exemplary operations of the communication device.

FIG. 3 is a flow chart 300 of exemplary operations of a communication device for visually impaired persons, e.g., communication device 100, in accordance with the various embodiments. Initially, one or more surface sensors are activated (step 302). As previously mentioned, activation may occur by touching the surface sensor, e.g., surface sensors 101. Data from the sensors, such as which key or input was sensed and if the handset or display was touched, is processed by, for example, logic processor 114 (step 304). The logic includes programming instructions for the guidance features of the device. In accordance with the various embodiments, one or more guidance features may result from the activated sensor(s), as indicated by "A", "B" and "C" on the figure. In the event that the sensed data does not result in any of the guidance features, then the user may receive an error message (step 320), such as an audible buzz, vibrate, whisper audio or any other visually-impaired-friendly technique for indicating an error has occurred or the system was unable to process the data. If the data from the sensor should result in a vibration of a key or other part of the communication device (step 306), then a command is sent to the sensed or other areas to cause a vibration of a surface element (step 303).

Figure 4:
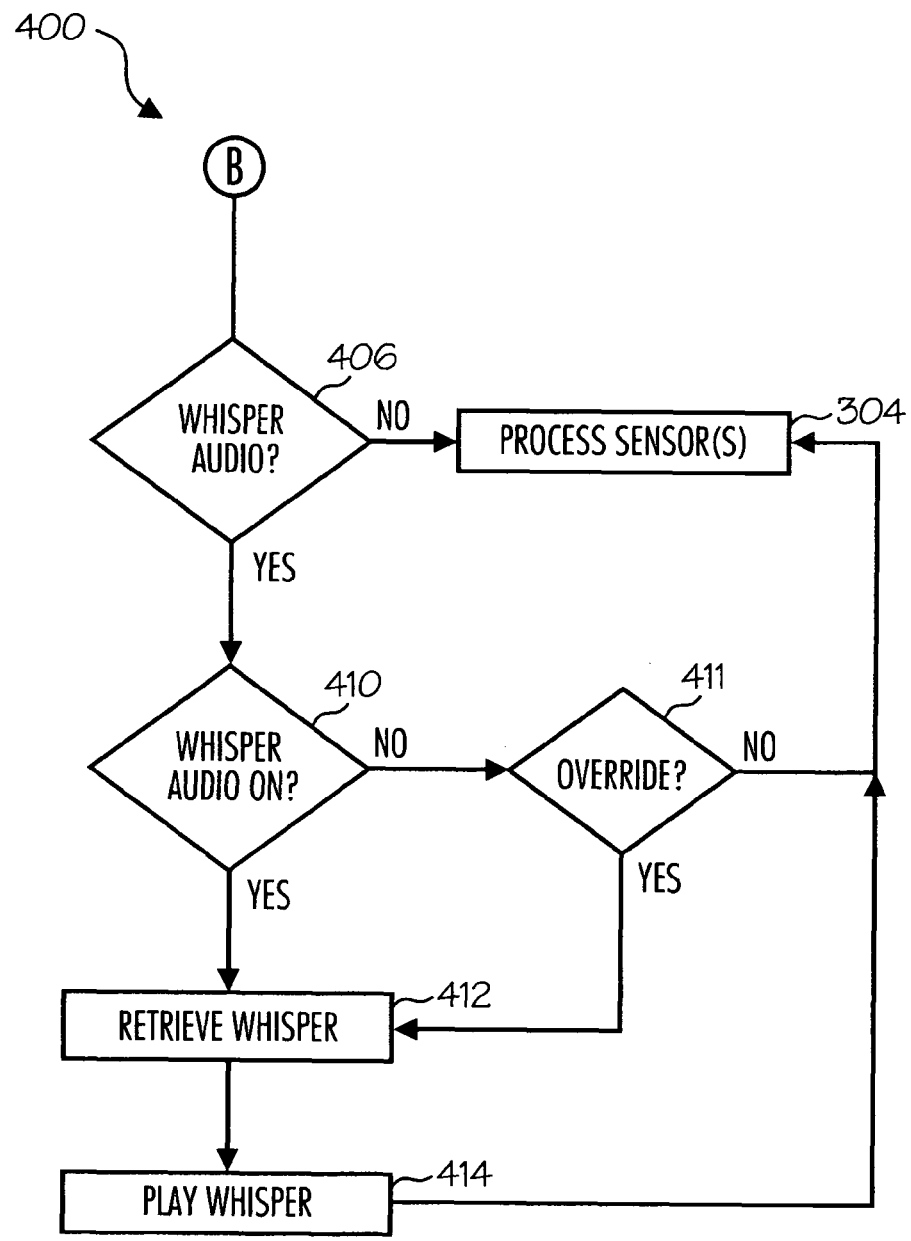

FIG. 4 is another flowchart 400 of exemplary operations of a communication device for visually impaired persons and, specifically a whisper audio guidance feature. The logic determines if the data from the sensor should result in a whisper audio (step 306). In one particular embodiment, the user has the option to disable some or all of the communication device's features. For instance, the user may wish to disable the audio attributes, like the whisper audio, while on a call. The logic must first determine if the whisper audio feature is engaged (step 410).

In one embodiment, the system may include an override feature (step 411). If the whisper audio feature is turned off so the user does not hear any guidance messages, then an override feature may be engaged to continue with the whisper audio anyway. This feature may be useful for extremely important activations of sensors such as if the user touches the "hang up" key during a call. In this manner, the system may confirm that the user intended to disconnect the current communication before completing the task. Similarly, the override may cause another guidance feature (other than the whisper audio) to be engaged if the whisper audio is turned off.

If whisper audio is on and the sensed data should result in a whisper audio, then the appropriate whisper audio message is retrieved and sent to the audio mixer (step 412). Depending on whether or not there is currently conversation audio from a caller, the whisper audio may or may not be mixed with other audio before being played back to the user (step 414).

Figure 5:
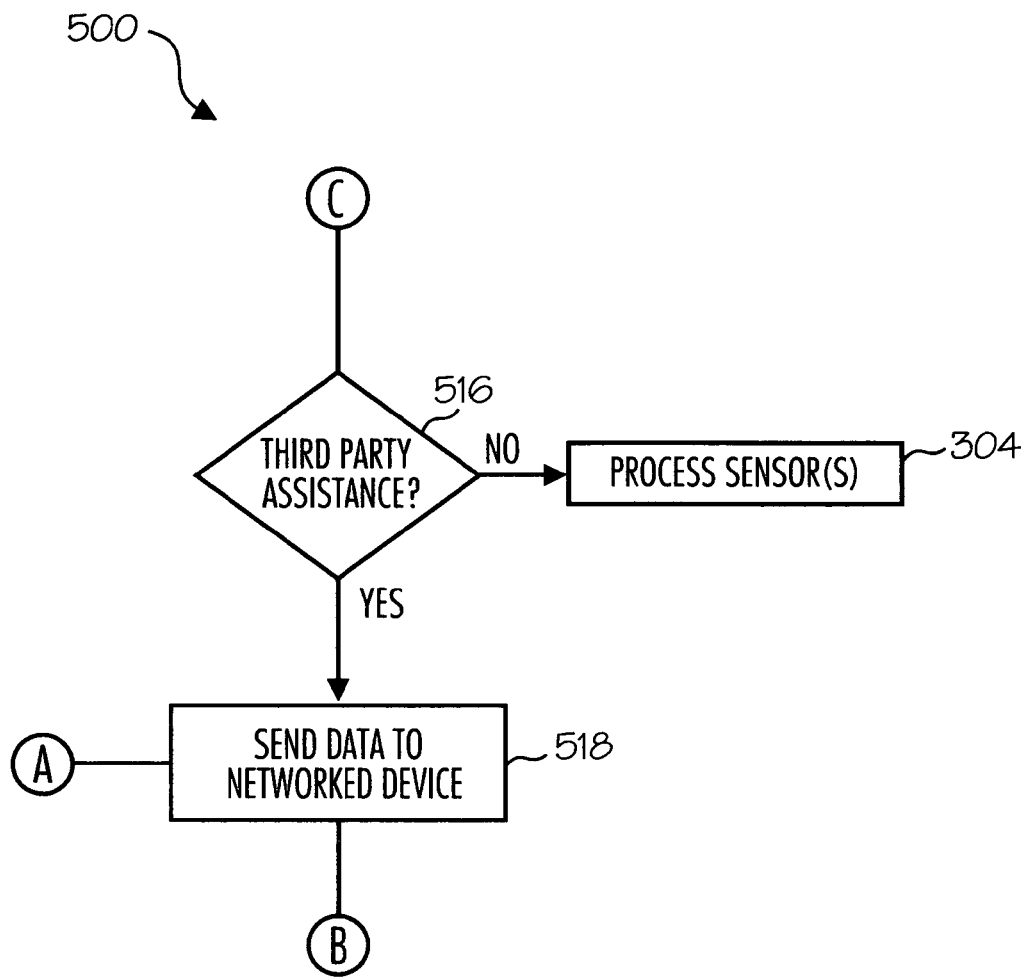

FIG. 5 is yet another flowchart 500 of exemplary operations of a communication device for visually impaired persons and, specifically a third party assistance guidance feature. The logic determines if the data from the sensor should result in third party assistance or if third party assistance is enabled (step 516). If third party assistance is engaged, then data pertaining to the user and the user's device is transmitted to the networked device (step 518). The data may be, for example, a physical emulation of communication device 100, a graphical user interface, or a replication of the user's actions displayed on the networked device. The third party user may have the option to coach the user through, for example, whisper audio instructions (step "B") that will not be heard by the called party or others in proximity to the user, or by causing functions to occur as is if the assisted user were touching communication device 100. The assisted user may be notified, for example, by whisper, that the third party assistor had depressed or cause a button to be depressed. The third party may also have the option to cause the user's device to vibrate (step "A").

There are several variations of the guidance features of the communication device, as disclosed herein, that may be useful to the visually impaired person. It should be appreciated the following embodiments are provided to enlighten the reader to these variations and are not intended as limitations on the disclosure.

As mentioned, the surface sensors may be activated by touch to trigger one or more guidance features of the communication device. Communication device 100 does not require any specially sized keys, inputs, display or handset, and from an external viewpoint, the surface of communication device 100 can look and feel just like any other communication device. Thus, standard alpha-numeric keys may be used that contain both a number and a series of alphabet letters. For example, the number "5" key may also include the letters "J", "K" and "L". To distinguish between the numbers and letters, the user may briefly touch or depress the key to represent a "5", prolong the touch for the letter "J" and longer for the "K" and so on. The whisper audio may play the corresponding number or letter as the user touches or depresses the key. Likewise, when a user touches a key such as a volume key, the user may hear a soft "volume." Continuing to touch the volume key may result in a whisper of "volume level 1" and the longer the user depresses the key the louder the volume may get and audibly report, e.g., "volume level 2" and so on.

The user may have an address book feature that assists the user in placing and controlling calls. For example, the user may select the address book by, e.g., depressing a soft key, and touch the display where the addresses appear. The whisper audio feature may announce the name and/or number corresponding to the touched address such that the user can "scroll" through the address book until the user hears the desired address. In this manner, as the display text changes so does the corresponding audio. Similarly, if the text on the touched area changes while the user is touching it (e.g., a clock), the audio feature updates to the user with the correct displayed text.

In yet another embodiment, the user may depress a series of keys, such as to make a call, and as each key is depressed, the user may hear the corresponding digit. Upon completion of the number/key entry, the communication system may attempt to look up the number in, for example, an address book, and whisper the name associated with the entered number to verify the user desires to call this address.

If the user should happen to activate multiple surface sensors simultaneously, such as depressing two keys at the same time, it is possible the logic processor may not be able to determine the correct result. In this case, an error message may be played to the user indicating an inability to determine the desired function. Additionally, the names of the multiple keys and/or activated areas may also be played to the user. In another embodiment, light touches may not be recognized by the logic as "true" indications of the user's desire. In this manner, a certain level of pressure or length of pressure is needed to activate the surface sensors. This may be useful to distinguish between actual depressions or selections and intermittent resting of the hand on the device or accidental touching of an area while reaching for a specific key, input or the like.

In yet another embodiment, the surface sensors may include a biometric feature such that user's fingerprints may be recognized and identified. This may be especially useful to prevent incidental touching of surface sensors by other digits. For example, the user may desire to depress the 1 key with the fore finger but simultaneously touches the 3 key with the pinkie finger. The fingerprint of the fore finger may be recognized as valid while the pinkie fingerprint is ignored.

Communication device 100 may also include a mock feature such that the user can manipulate the device and its feature without causing an actual communication event to occur. This may be useful in a training exercise to learn the various locations and responses of communication device 100. Additionally, the mock feature may be used during a communication to prevent an unintentional control option to occur. In this manner, the user can engage the mock feature and test the option before actually performing the option. In one particular embodiment, the mock feature is a specific identifiable key on the device. In another embodiment, the mock feature may be a specific surface area (e.g., touching the back or sides of the device).

Depending on the level of the user's disability, communication device 100 may be configured to include options which allow the user to gain the maximum benefit. For instance, third party assistance may include a high or low level of assistance, the use or non-use of LEDs, and the volume of audio feedback.

Presented herein are various embodiments, methods and techniques, including a best mode, for a communication device for visually impaired persons. Having read this disclosure, one skilled in the industry may contemplate other similar devices, techniques, modifications of structure, arrangements, proportions, elements, materials, and components for such a communication device that falls within the scope of the present invention. These and other changes or modifications are intended to be included within the scope of the invention, as expressed in the following claims.

The invention claimed is:

1. A communication device for a visually impaired user comprising:
   a plurality of sensed areas comprising one or more of the following, a plurality of function keys on a surface of the device, a handset, one or more input jacks, an audio receiver and an audio transmitter;
   a plurality of surface sensors coupled to the sensed areas, the surface sensors being activated by the user's touch;
   a logic processor coupled to the surface sensors and configured to provide a plurality of commands based upon the activated surface sensor;
   a whisper audio storage having a plurality of pre-recorded audio messages, the audio messages representative of a function of each sensed area and retrieved upon command from the logic processor; and
   an audio mixer configured to couple the audio message with an audio conversation for play-back to the user at the audio receiver,
   wherein only the user hears the audio message corresponding to the sensed area activated by the user's touch.

2. The communication device for the visually impaired user of claim 1, further comprising a vibration feature that upon command from the logic processor causes the sensed area to vibrate.

3. The communication device for the visually impaired user of claim 1, further comprising a remote networked device bi-directionally coupled to the logic processor, wherein a third party assistant is able to monitor the visually impaired user's activity on the communication device.

4. The communication device for the visually impaired user of claim 3, wherein the logic processor is configured to receive a third party audio message from the third party assistant and send the third party audio message to the audio mixer for play-back to the visually impaired user.

5. The communication device for the visually impaired user of claim 1, wherein the plurality of sensed areas further comprises a display on the surface of the device.

6. The communication device for the visually impaired user of claim 5, wherein the user's touch of the surface sensor coupled to the display causes the user to hear the audio message corresponding to a displayed text on the display.

7. The communication device for the visually impaired user of claim 6, wherein as the user's touches the display and the displayed text changes, so does the corresponding audio message played to the user.

8. The communication device for the visually impaired user of claim 1, wherein the surface sensors comprise capacitive sensors.

9. The communication device for the visually impaired user of claim 1, further comprising a biometric feature that recognizes a fingerprint of the user to determine if a valid key has been selected.

10. The communication device for the visually impaired user of claim 1, further comprising a disable feature so the user can temporarily disable the audio message play-back.

11. The communication device for the visually impaired user of claim 1, further comprising a remote networked device bi-directionally coupled to the logic processor, wherein a third party assistant is able to monitor the visually impaired user's activity on the communication device.

12. The communication device for the visually impaired user of claim 11, wherein the logic processor is configured to receive a third party instruction from the third party assistant, the third party instruction causing the logic processor to activate the vibrator.

* * * * *